(12) United States Patent
Hillebrand (10) Patent No.: US 10,935,374 B2
(45) Date of Patent: Mar. 2, 2021

(54) SYSTEMS AND METHODS FOR GENERATING MODELS OF SCANNED ENVIRONMENTS

(71) Applicant: FARO Technologies, Inc., Lake Mary, FL (US)

(72) Inventor: Gerrit Hillebrand, Waiblingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 60 days.

(21) Appl. No.: 16/272,125

(22) Filed: Feb. 11, 2019

(65) Prior Publication Data
US 2019/0257644 A1  Aug. 22, 2019

Related U.S. Application Data

(60) Provisional application No. 62/633,135, filed on Feb. 21, 2018.

(51) Int. Cl.
| | | |
|---|---|---|
| *G06T 17/00* | (2006.01) | |
| *G01B 11/25* | (2006.01) | |
| *G06T 7/73* | (2017.01) | |
| *G01B 11/03* | (2006.01) | |
| *G06K 9/00* | (2006.01) | |
| *G06T 17/10* | (2006.01) | |
| *G01B 11/02* | (2006.01) | |

(52) U.S. Cl.
CPC ........ *G01B 11/2518* (2013.01); *G01B 11/026* (2013.01); *G01B 11/03* (2013.01); *G06K 9/00201* (2013.01); *G06T 7/75* (2017.01); *G06T 17/10* (2013.01); *G01B 2210/60* (2013.01); *G06T 2207/30204* (2013.01)

(58) Field of Classification Search
CPC ....... G06K 9/00201; G06T 7/50–7/596; G06T 2207/10028; G06T 2207/10012; G06T 2200/04; H04N 13/204–13/257; H04N 2013/0074–2013/0081; G01S 17/89–17/90; G01S 17/42; G01S 17/48; G01S 17/894; G01B 11/2545; G01B 11/026; G01B 11/03; G01B 21/04–21/047
See application file for complete search history.

(56) References Cited

U.S. PATENT DOCUMENTS

| | | | | |
|---|---|---|---|---|
| 5,725,253 A | * | 3/1998 | Salive | G09F 3/0297 |
| | | | | 235/375 |
| 8,625,854 B2 | | 1/2014 | Valkenburg et al. | |
| (Continued) | | | | |

OTHER PUBLICATIONS

European Search Report for European Application No. 19158217.0, International Filing Date Feb. 20, 2019, dated Jul. 9, 2019, 7 pages.

*Primary Examiner* — Brian Werner
(74) *Attorney, Agent, or Firm* — Cantor Colburn LLP (57) ABSTRACT

Three-dimensional (3D) measurement systems and methods are provided. The systems and methods include a 3D imager and a marker. The marker includes an adapter and a marker element, wherein the adapter is arranged to be at least one of installed, placed, and attached to a fixed object of a scanned environment and the marker element includes a coded identifier that is detectable by the 3D imager, wherein the coded identifier identifies the specific location of the fixed object within the scanned environment.

18 Claims, 6 Drawing Sheets

(56) References Cited

U.S. PATENT DOCUMENTS

| | | | |
|---|---|---|---|
| 9,752,863 B2 | 9/2017 | Hinderling et al. | |
| 2008/0123110 A1* | 5/2008 | Dickinson | G01B 11/03 |
| | | | 356/620 |
| 2011/0121068 A1 | 5/2011 | Emanuel et al. | |
| 2013/0228620 A1* | 9/2013 | Ahern | G06F 16/50 |
| | | | 235/439 |
| 2013/0237811 A1 | 9/2013 | Mihailescu et al. | |
| 2017/0092005 A1 | 3/2017 | Hasegawa | |
| 2017/0235983 A1* | 8/2017 | Alwesh | G06F 17/00 |
| | | | 235/385 |

\* cited by examiner

SYSTEMS AND METHODS FOR GENERATING MODELS OF SCANNED ENVIRONMENTS

CROSS REFERENCE TO RELATED APPLICATIONS

This application claims the benefit of an earlier filing date from U.S. Provisional Application Ser. No. 62/633,135, filed Feb. 21, 2018, the entire disclosure of which is incorporated herein by reference.

BACKGROUND

The subject matter disclosed herein relates to systems and methods for measuring three-dimensional (3D) coordinates of a scanned environment, and in particular, to a systems and methods of locating specific fixed objections within the scanned environment.

A 3D imager is a portable device having a projector that projects light patterns on the surface of an object to be scanned. Typically the projector emits a coded or uncoded pattern. One (or more) cameras, having a predetermined positions and alignment relative to the projector, record images of the light pattern on the surface of an object. The three-dimensional coordinates of elements in the light pattern can be determined by trigonometric methods, such as by using epipolar geometry.

Other types of noncontact devices may also be used to measure 3D coordinates, such as those that use time-of-flight techniques (e.g. laser trackers, laser scanners, time-of-flight cameras, etc.). These devices emit a light beam and measure the amount of time it takes for light to travel to the surface and return to the device to determine the distance. Typically, the time-of-flight scanner is stationary and includes mechanisms to rotate about two orthogonal axis to direct the light beam in a direction. By knowing the distance and the two angles, 3D coordinates may be determined.

During scanning operations, as described above, various fixed objects within a scanned environment may not be readily and/or accurately identified. Accordingly, while existing systems that measure 3D coordinates are suitable for their intended purpose, the need for improvement remains, particularly in providing systems and methods that allow for identifying precise locations of fixed objects within the 3D coordinates of a scanned environment.

BRIEF DESCRIPTION

According to some embodiments, three-dimensional (3D) measurement systems are provided. The measurement systems include a 3D imager and a marker. The marker includes an adapter and a marker element. The adapter is arranged to be at least one of installed, placed, and attached to a fixed object of a scanned environment and the marker element includes a coded identifier that is detectable by the 3D imager. The coded identifier identifies the specific location of the fixed object within the scanned environment.

In addition to one or more of the features described herein, or as an alternative, further embodiments of the measurement systems may include that the fixed object is at least one of an outlet, a switch, a pipe, a stud, and a fixture.

In addition to one or more of the features described herein, or as an alternative, further embodiments of the measurement systems may include that the coded identifier includes a coded portion and a central portion, wherein the coded portion is readable by the 3D imager to convey information about the marker and the central portion is arranged to identify a center of the fixed object.

In addition to one or more of the features described herein, or as an alternative, further embodiments of the measurement systems may include that the 3D imager comprises at least one of a triangulation imager device and a time-of-flight scanning device.

In addition to one or more of the features described herein, or as an alternative, further embodiments of the measurement systems may include that the adapter comprises an adapter base and a fixed object connector, wherein the fixed object connector is arranged to engage with the fixed object of the scanned environment.

In addition to one or more of the features described herein, or as an alternative, further embodiments of the measurement systems may include that the fixed object connector is an electrical connector for insertion into an outlet.

In addition to one or more of the features described herein, or as an alternative, further embodiments of the measurement systems may include that the adapter base has the marker element installed thereto.

In addition to one or more of the features described herein, or as an alternative, further embodiments of the measurement systems may include that the marker element is removably attachable to the adapter.

In addition to one or more of the features described herein, or as an alternative, further embodiments of the measurement systems may include that the marker element and the adapter are attachable by at least one of a tongue-and-groove and a threaded engagement.

In addition to one or more of the features described herein, or as an alternative, further embodiments of the measurement systems may include that the marker element and the adapter form a unitary structure.

According to some embodiments, methods of generating a model of a scanned environment are provided. The methods include installing a marker to a fixed object within the scanned environment, wherein the marker includes an adapter and a marker element, wherein the adapter is arranged to be at least one of installed, placed, and attached to the fixed object of the scanned environment and the marker element includes a coded identifier that is detectable by a 3D imager, wherein the coded identifier identifies a specific location of the fixed object within the scanned environment, scanning the scanned environment with a 3D imager to obtain three-dimensional coordinate data of the scanned environment, wherein the three-dimensional coordinate data includes data associated with the coded identifier, and generating a model of the scanned environment based on the three-dimensional coordinate data obtained during the scanning, wherein the data associated with the coded identifier enables precise identification of the location of the fixed object within the model of the scanned environment.

In addition to one or more of the features described herein, or as an alternative, further embodiments of the methods may include that the fixed object is at least one of an outlet, a switch, a pipe, a stud, and a fixture.

In addition to one or more of the features described herein, or as an alternative, further embodiments of the methods may include that the coded identifier includes a coded portion and a central portion, wherein the coded portion is readable by the 3D imager to convey information about the marker and the central portion is arranged to identify a center of the fixed object.

In addition to one or more of the features described herein, or as an alternative, further embodiments of the methods may include that the 3D imager comprises at least one of a triangulation imager device and a time-of-flight scanning device.

In addition to one or more of the features described herein, or as an alternative, further embodiments of the methods may include that the adapter comprises an adapter base and a fixed object connector, wherein the fixed object connector is arranged to engage with the fixed object of the scanned environment.

In addition to one or more of the features described herein, or as an alternative, further embodiments of the methods may include that the fixed object connector is an electrical connector for insertion into an outlet.

In addition to one or more of the features described herein, or as an alternative, further embodiments of the methods may include that the adapter base has the marker element installed thereto.

In addition to one or more of the features described herein, or as an alternative, further embodiments of the methods may include that the marker element is removably attachable to the adapter.

In addition to one or more of the features described herein, or as an alternative, further embodiments of the methods may include that the marker element and the adapter are attachable by at least one of a tongue-and-groove and a threaded engagement.

In addition to one or more of the features described herein, or as an alternative, further embodiments of the methods may include that the marker element and the adapter form a unitary structure.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

The detailed description explains embodiments of the disclosure, together with advantages and features, by way of example with reference to the drawings.

DETAILED DESCRIPTION

Embodiments of the present disclosure provide for a three-dimensional (3D) measurement system that enables precise positioning of various elements or components within a modeled space.

Figure 1:
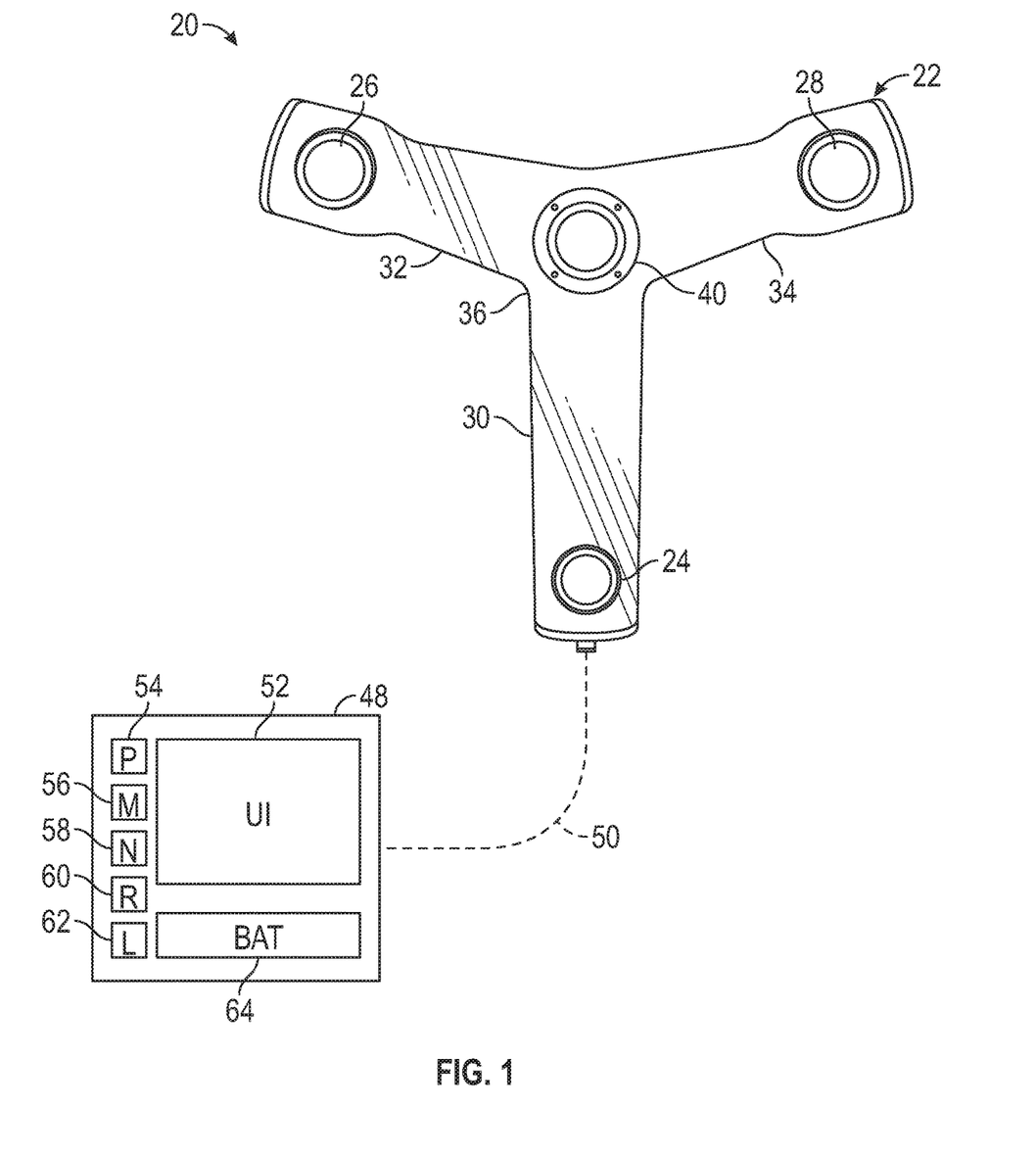
FIG. 1 is a view of a 3D imager system in accordance with an embodiment of the present disclosure.

Referring now to FIG. 1, a measurement device, such as three dimensional (3D) imager system 20, is shown for determining 3D coordinates of surfaces in an environment. The 3D imager system 20 includes an image scanner 22 having a projector 24, a first camera 26, and a second camera 28. In the present illustrative embodiment, the projector 24 and cameras 26, 28 are each disposed on separate arms 30, 32, 34 of a housing 36. The cameras 26, 28 may be used to capture information reflected from a projection of the projector 24 to thus capture information regarding a scanned environment.

Further, in the present embodiment, a color camera 40 is centrally disposed on (or in) the housing 36 between the arms 30, 32, 34. The color camera 40 may have a field of view that acquires images, including color information, of an environment being scanned.

In a non-limiting embodiment, the color camera 40 may be used to provide color (texture) information for incorporation into the 3D image. In some embodiments, the color camera 40 can be arranged to acquire a video image that is used to register multiple 3D images through the use of videogrammetry. The color camera 40 is sometimes referred to as an RGB camera. In an embodiment discussed below, the image scanner 22 may further have an annotation device, such as a microphone or a laser light source that emits a visible beam of light. In an embodiment, the laser light source may include an assembly, such as a digital micromirror device (DMD) or galvomirrors for example, that allows the visible beam of light to be moved relative to the image scanner 22.

As discussed in more detail herein, in an embodiment, the projector 24 projects a pattern of light onto surfaces in the scanned environment. As used herein, the term "projector" is defined to generally refer to a device for producing and emitting a pattern of light. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

The cameras 26, 28 acquire images of the pattern of light and, in some instances, are able to determine the 3D coordinates of points on the surfaces of the scanned environment using trigonometric principles, e.g., epipolar geometry. In one embodiment, the projector 24 produces the pattern on surfaces/objects of the scanned environment only during the time periods when the cameras 26, 28 (and if available camera 40) are recording images of the scanned environment. This provides advantages in energy efficiency and helps for eye protection considerations for users of the 3D imager system 20.

In accordance with a non-limiting embodiments, the cameras 26, 28 and the projector 24 are synchronized or coordinated with each other, with regard to both time and pattern used. In a recording process, the projector 24 produces (and projects) the pattern, similar to a flash in photography, and the cameras 26, 28 (and, if available, camera 40) acquire pairs of images, such that one image is captured at each of the cameras 26, 28. In a non-limiting example, the projection of the pattern of light by the projector 24 and the acquisition of the images at the cameras 26, 28, 40 are performed simultaneously. As used herein, these pairs (or triples if color camera 40 is present) of images that are acquired at substantially the same time are referred to as "frames." The recording process can comprise one single frame (shot), or a sequence of a plurality of frames (video). After processing of the data, each frame then constitutes a 3D-scan consisting of a point cloud in the three-dimensional space. The point cloud is defined in the relative local coordinate system of the 3D imager system 20.

It should be appreciated that while the illustrated embodiment shows and describes a device that determines 3D coordinates using an image scanner, this is for illustrative and explanatory purposes and the claimed invention is not so limited. For example, in other embodiments, devices that use other noncontact means for measuring 3D coordinates may also be used, such as a laser scanner device that uses time-of-flight to determine a distance to a surface or object in a scanned environment.

As shown, a controller 48 is coupled for communication to the projector 24 and cameras 26, 28, 40. It should be appreciated that while embodiments herein describe the controller 48 as being separate from the housing 36, in some embodiments one or more components described herein with respect to the controller 48 may be positioned within the housing 36. The connection may be a wired-connection/data-transmission-media 50 or a wireless connection. The controller 48 is a suitable electronic device capable of accepting data and instructions, executing the instructions, processing the data, and (optionally) presenting results. Controller 48 may accept instructions through a user interface 52, or through other means such as, but not limited to, electronic data card, voice activation means, manually-operable selection and control means, radiated wavelength, and/or electronic or electrical transfer.

The controller 48 uses signals to act as input to various processes for controlling the system 20. The digital signals represent data associated with the system 20, including, but not limited to, images acquired by cameras 26, 28, 40, temperature, ambient light levels, operator inputs via the user interface 52, and the like.

The controller 48 is operably coupled with one or more components of the system 20, such as the image scanner 22, for example, by the data transmission media 50. The data transmission media 50 may be, but is not limited to, twisted pair wiring, coaxial cable, and fiber optic cable. Alternatively, or in combination, the data transmission media 50 also includes, but is not limited to, wireless, radio, and infrared signal transmission systems. The controller 48 is configured to provide operating signals to the components of the system 20 and to receive data from the components via the data transmission media 50.

In general, the controller 48 accepts data from the cameras 26, 28, 40 and/or the projector 24, and is given certain instructions for the purpose of determining the 3D coordinates of points on surfaces, objects, etc. of a scanned environment. The controller 48 may compare the operational parameters to predetermined variances and if the predetermined variance is exceeded, the controller 48 may generate a signal that can be used to indicate an alarm to an operator or to a remote computer via a network. Additionally, the signal may initiate other control methods that adapt the operation of the system 20 such as changing the operational state of cameras 26, 28, 40, the projector 24, or other light source to compensate for an out of variance operating parameter.

The data received from cameras 26, 28, 40 may be displayed on the user interface 52. The user interface 52 may be a display as known in the art, such as an LED (light-emitting diode) display, an LCD (liquid-crystal diode) display, a CRT (cathode ray tube) display, a touch-screen display, or the like. A keypad or other input device/component/element may optionally be coupled to the user interface 52 for providing data input to controller 48. In an embodiment, the controller 48 displays, on the user interface 52, a point cloud to visually represent the acquired 3D coordinates of a scanned environment. It will be appreciated that in some embodiments, the user interface 52 may be integrated into the housing 36.

In addition to being coupled to one or more components within the system 20, the controller 48 may also be coupled to external computer networks such as a local area network (LAN) and/or the Internet. A LAN interconnects one or more remote computers, which are configured to communicate with the controller 48 using a well-known computer communications protocol such as TCP/IP (Transmission Control Protocol/Internet Protocol), RS-232, ModBus, and the like. Additional systems, similar to system 20, may be connected to a LAN with respective controllers. Each of the systems may be configured to send and receive data to and from remote computers and other systems. In some embodiments, the LAN may be connected to the Internet. An Internet connection can allow the controller 48 to communicate with one or more remote computers or other systems connected to the Internet.

The controller 48 includes a processor 54 coupled to a random access memory device 56, a non-volatile memory device 58, a read-only memory device 60, one or more input/output controllers and/or elements as known in the art, and an optional LAN interface device 62 via a data communications bus. In embodiments having a LAN interface device 62, the LAN interface device 62 provides for communication between the controller 48 and a network in a data communications protocol supported by the network. The ROM device 60 can be configured to store an application code, e.g., main functionality firmware, including initializing parameters, and boot code, for the processor 54. Application code also includes program instructions for causing the processor 54 to execute any operation control methods of the system 20, including starting and stopping operation, changing operational states of projector 24, monitoring predetermined operating parameters, generation of alarms, etc. In an embodiment, the application code can create an onboard telemetry system that may be used to transmit operating information between the system 20 and one or more remote computers or receiving locations. The information to be exchanged with remote computers and the controller 48 can include but are not limited to 3D coordinate data and images associated with a scanned environment.

The non-volatile memory device 58 may be any form of non-volatile memory such as an EPROM (Erasable Programmable Read Only Memory) chip, a disk drive, or the like. Stored in the non-volatile memory device 58 are various operational parameters for the application code. The various operational parameters can be input to non-volatile memory device 58 either locally, using the user interface 52 or through use of a remote computer, or remotely via the Internet using a remote computer. It will be recognized that application code can be stored in non-volatile memory device 58 or the read-only memory device 60.

The controller 48 includes operation control methods embodied in application code. The methods are embodied in computer instructions written to be executed by the processor 54, typically in the form of software. The software can be encoded in any language, including, but not limited to, assembly language, VHDL (Verilog Hardware Description Language), VHSIC HDL (Very High Speed IC Hardware Description Language), Fortran (formula translation), C, C++, Visual C++, C#, Objective-C, Java, Javascript ALGOL (algorithmic language), BASIC (beginners all-purpose symbolic instruction code), visual BASIC, ActiveX, HTML (HyperText Markup Language), Python, Ruby, and/or, for example, any combination or derivative of at least one of the foregoing. Additionally, an operator can use an existing software application such as a spreadsheet or database and correlate various cells with the variables enumerated in the algorithms. Furthermore, the software can be independent of other software or dependent upon other software, such as in the form of integrated software.

In an embodiment, the controller 48 may be configured to process data furnished to generate the 3D scans from the frames. The 3D scans in turn are joined or registered in a common coordinate frame of reference. For registering, known methods can be used, such as by identifying natural or artificial targets (i.e., recognizable structures within a scanned environment) in overlapping areas of two or more frames. In an embodiment, the multiple frames are dynamically registered using a local bundle adjustment method. Through identification of these targets, the assignment of two 3D scans may be determined by means of corresponding pairs. A whole scene (a plurality of frames) is thus gradually registered by the imager scanner 22. In some embodiments, the individual frames may be registered to a point cloud generated by a laser scanner.

In an embodiment, the controller 48 further includes an energy source, such as battery 64. The battery 64 may be an electrochemical device that provides electrical power for the controller 48. In an embodiment, the battery 64 may also provide electrical power to the image scanner 22 (e.g., cameras 26, 28, 40 and projector 24). In some embodiments, the battery 64 may be separate from the controller 48 (e.g. a battery pack). In an embodiment, a second battery (not shown) may be disposed in the housing 36 to provide electrical power to the image scanner 22 (e.g., cameras 26, 28, 40 and projector 24). In still further embodiments, a light source used with the image scanner 22 may have a separate energy source (e.g. a battery pack).

It should be appreciated that while the controller 48 is illustrated as being separate from the housing 36, this is for exemplary purposes and the claims should not be so limited. In other embodiments, the controller 48 is integrated into the housing 36. Further, while embodiments herein illustrate the controller 48 as being coupled with a single image scanner 22, this is for exemplary purposes and the claims should not be so limited. In other embodiments, the controller 48 may be coupled to and combine three-dimensional coordinate data from multiple image scanners 22.

In the illustrated embodiment, the projector 24 and cameras 26, 28 are arranged spaced apart in a triangular arrangement where the relative distances and positions between the components is known. The triangular arrangement is advantageous in providing information beyond that available for two cameras and a projector arranged in a straight line or from a system with a projector and a single camera. The additional information may be understood in reference to FIG. 2, which illustrates the concept of epipolar constraints, and FIG. 3 that illustrates how epipolar constraints are advantageously applied to the triangular arrangement of the system 20.

Figure 2:
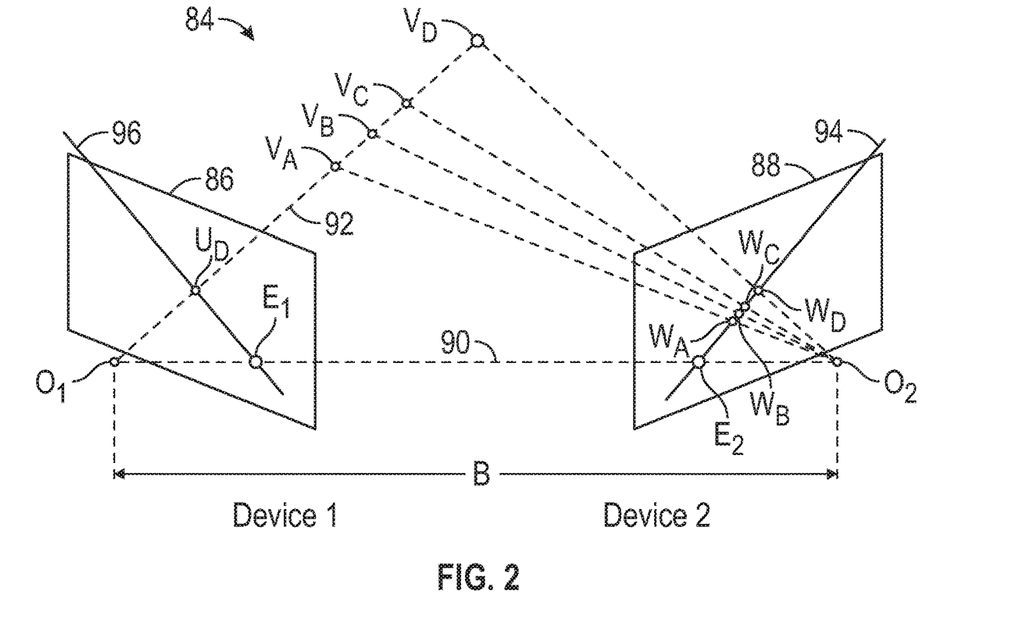
FIG. 2 is a schematic illustration of the principle of operation of the 3D imager of FIG. 1.

In FIG. 2, a 3D triangulation instrument 84 includes a Device 1 and a Device 2 on left and right sides as viewed from the viewpoint of FIG. 2, respectively. Device 1 and Device 2 may be two cameras or Device 1 and Device 2 may be one camera and one projector. Each of the Device 1 and Device 2, whether a camera or a projector, has a respective perspective center $O_1$, $O_2$, and a representative plane 86, 88. The perspective centers $O_1$, $O_2$ are separated by a baseline distance B, which is the length of the line 90. The perspective centers $O_1$, $O_2$ are points through which rays of light may be considered to travel, either to or from a point on a surface in the area of the environment being scanned. The rays of light either emerge from an illuminated projector pattern or impinge on a photosensitive array. The placement of the reference planes 86, 88 is applied in FIG. 2, which shows the reference planes 86, 88 between an object point and the perspective centers $O_1$, $O_2$.

In FIG. 2, for the reference plane 86 angled toward the perspective center $O_2$ and the reference plane 88 angled toward the perspective center $O_1$, a line 90 drawn between the perspective centers $O_1$, $O_2$ crosses the planes 86 and 88 at epipole points $E_1$, $E_2$, respectively. Consider a point $U_D$ on the plane 86. If Device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of Device 2. This is true whether Device 2 is a camera or a projector. It is also true that the four points $W_A$, $W_B$, $W_C$, $W_D$ lie on a straight line 94 in the plane 88. This line, which is the line of intersection of the reference plane 88 with the plane of $O_1$-$O_2$-$U_D$, is referred to as the epipolar line 94. It follows that any epipolar line on the reference plane 88 passes through the epipole $E_2$. Just as there is an epipolar line on the reference plane of Device 2 for any point on the reference plane of Device 1, there is also an epipolar line 96 on the reference plane of Device 1 for any point on the reference plane of Device 2.

Figure 3:
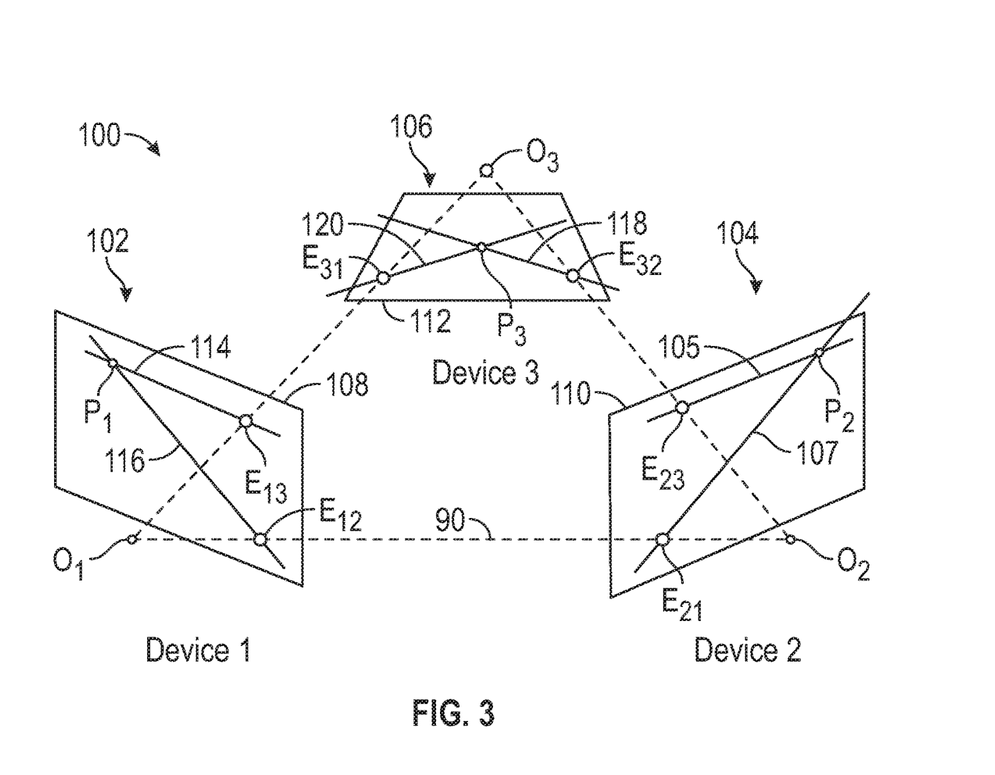
FIG. 3 is another schematic illustration of the principle of operation of the 3D imager of FIG. 1.

FIG. 3 illustrates the epipolar relationships for a 3D imager 100 corresponding to triangulation instrument 84 of FIG. 2 in which two cameras and one projector are arranged in a triangular pattern. In general, the devices 102, 104, 106 (Device 1, Device 2, Device 3) may be any combination of cameras and projectors as long as at least one of the devices is a camera. Each of the three devices 102, 104, 106 has a perspective center $O_1$, $O_2$, $O_3$, respectively, and a reference plane 108, 110, 112, respectively. Each pair of devices 102, 104, 106 has a pair of epipoles. Device 1 and Device 2 have epipoles $E_{12}$, $E_{21}$ on the planes 108, 110, respectively. Device 1 and Device 3 have epipoles $E_{13}$, $E_{31}$, respectively on the planes 108, 112, respectively. Device 2 and Device 3 have epipoles $E_{23}$, $E_{32}$ on the planes 110, 112, respectively. In other words, each reference plane includes two epipoles. The reference plane for Device 1 includes epipoles $E_{12}$ and $E_{13}$. The reference plane for Device 2 includes epipoles $E_{21}$ and $E_{23}$. The reference plane for Device 3 includes epipoles $E_{31}$ and $E_{32}$.

Consider the embodiment of FIG. 3 in which Device 3 is a projector, Device 1 is a first camera, and Device 2 is a second camera. Suppose that a projection point $P_3$, a first image point $P_1$, and a second image point $P_2$ are obtained in a measurement. These results can be checked for consistency in the following manner.

To check the consistency of the image point $P_1$, intersect the plane $P_3$-$E_{31}$-$E_{13}$ with the reference plane 108 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 110 to obtain the epipolar line 105. Intersect the plane $P_1$-$E_{12}$-$E_{21}$ to obtain the epipolar line 107. If the image point $P_2$ has been determined consistently, the observed image point $P_2$ will lie on the intersection of the determined epipolar lines 107 and 105.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 120.

The redundancy of information provided by using a 3D imager 100 having a triangular arrangement of projector and cameras may be used to reduce measurement time, to identify errors, and to automatically update compensation/calibration parameters. It should be appreciated that based on the epipolar geometry relationships described herein, the distance from an image scanner of the present disclosure to points on the surface being scanned may be determined. By moving the image scanner, the determination of the pose/orientation of the image scanner, and a registration process the three dimensional coordinates of locations (point data) on a surface may be determined.

Figure 4:
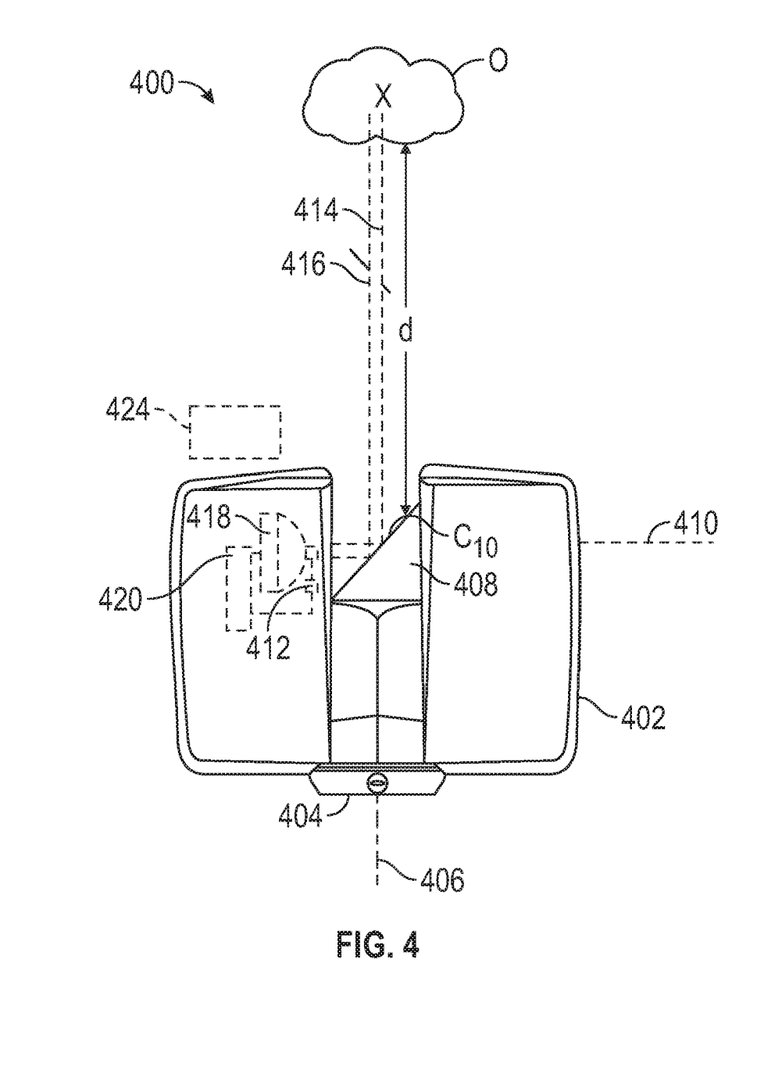
FIG. 4 is a side view of a 3D scanning system in accordance with an embodiment of the present disclosure.

Referring now to FIG. 4, a 3D scanner 400 (e.g., a laser scanner) is shown. The 3D scanner 400 may be used for optically scanning and measuring a scanned environment using time-of-flight methods. The 3D scanner 400 comprises a measuring head 402 and a base 404. The measuring head 402 is mounted on the base 404 such that the measuring head 402 can rotate with respect to the base 404 about a first axis 406, driven by a first rotary drive (e.g., a motor). The rotation about the first axis 406 may be about the center of the base 404. The measuring head 402 comprises a mirror 408, which can rotate about a second axis 410, driven by a second rotary drive (e.g., a motor). Referring to a normal upright position of the 3D scanner 400, the first axis 406 may be called the vertical axis or azimuth axis, while the second axis 410 may be called the horizontal axis or zenith axis. The 3D scanner 400 may comprise a gimbal point or center $C_{10}$ that is the intersection point of the first axis 406 and the second axis 410.

The measuring head 402 is further provided with an electromagnetic radiation emitter 412, such as light emitter, that emits an emission light beam 414. In an embodiment, the emission light beam 414 may be a coherent light such as a laser beam. As will be appreciated by those of skill in the art, the laser beam may have a wavelength range of approximately 300 to 1600 nanometers, for example, 790 nanometers, 905 nanometers, 1550 nanometers, or less than 400 nanometers. It should be appreciated that other electromagnetic radiation beams having greater or smaller wavelengths may also be used. The emission light beam 414 may be amplitude or intensity modulated, for example, with a sinusoidal waveform or with a rectangular waveform. Alternatively, the emission light beam 414 may be otherwise modulated, for example, with a chirp signal, or coherent receiver methods may be used. In the present embodiment, the emission light beam 414 is a continuous wave laser beam. However, it may also be a pulsed laser. The emission light beam 414 is emitted by the light emitter 412 onto the mirror 408, where it is deflected to the environment of the 3D scanner 400.

A reflected light beam, hereinafter called a reception light beam 416, is reflected from the scanned environment by an object O that is within the scanned environment. The reflected or scattered light is intercepted by the rotary mirror 408 and directed onto a light receiver 418 with reception optics. The directions of the emission light beam 414 and the reception light beam 416 result from the angular positions of the measuring head 402 and the mirror 408 about the axes 406 and 410, respectively. The angular positions in turn depend on the corresponding rotary drives. The angle of rotation about the first axis 406 is measured by a first angular encoder. The angle of rotation about the second axis 410 is measured by a second angular encoder.

A controller 420 is coupled to communicate with the light emitter 412 and the light receiver 418 inside the measuring head 402. It should be appreciated that while the controller 420 is illustrated as being a single device or circuit, this is for exemplary purposes and the claims should not be so limited. In other embodiments, the controller 420 may be comprised of a plurality of devices or circuits. In some embodiments, a portion of the controller 420 may be arranged outside the measuring head 402, for example, as a computer connected to the base 404 or other components of the 3D scanner 400.

The operation of the 3D scanner 400 is controlled by controller 420. The controller 420 is a suitable electronic device capable of accepting data and instructions, executing the instructions to process the data, and, in some configurations, presenting the results. The controller 420 may accept instructions through user interface, or through other means such as but not limited to electronic data card, voice activation means, manually-operable selection and control means, radiated wavelength and electronic or electrical transfer. The controller 420 may be a microprocessor, microcomputer, a minicomputer, an optical computer, a board computer, a complex instruction set computer, an ASIC (application specific integrated circuit), a reduced instruction set computer, a computer network, a desktop computer, a laptop computer, a scientific computer, a scientific calculator, or a hybrid of any of the foregoing.

Controller 420 is capable of converting an analog voltage or current level provided by sensors (e.g., encoders) into digital signal(s). Alternatively, sensors may be configured to provide a digital signal to controller 420, or an analog-to-digital (A/D) converter (not shown) maybe coupled between sensors and controller 420 to convert the analog signal provided by sensors into a digital signal for processing by controller 420. Controller 420 uses the digital signals act as input to various processes for controlling the 3D scanner 400. The digital signals represent one or more system data including but not limited to angular position about the axis 406, angular position about the axis 410, time-of-flight of the light beams 414, 416, and the like.

In general, controller 420 accepts data from sensors, light emitter 416 and light receiver 420, and is given certain instructions for the purpose of determining three-dimensional coordinates of points in the scanned environment. Further, the controller 420 may compare operational parameters to predetermined variances and if a predetermined variance is exceeded, the controller 420 can generate a signal that may be used to indicate an alarm to an operator. Additionally, the signal may initiate other control methods that adapt the operation of the laser scanner 400 such as changing or stopping the rotation about the axis 406 once a predetermined angular position is achieved.

In some embodiments, the 3D scanner 400 may optionally include a color camera 424 that acquires two dimensional (2D) color images of the scanned environment as a scan is performed. The 2D images may be synchronized with the acquired 3D coordinate points obtained by the 3D scanner 400. This allows for the association of a color and/or a texture with the 3D coordinate point by the controller 420. In some embodiments, the color camera 424 is disposed internally to the laser scanner 400 and acquires images via the mirror 408.

In addition to being coupled to one or more components within system 400, controller 420 may also be coupled to external computer networks such as a local area network (LAN) and/or the Internet, similar to the connections described with respect to FIG. 1. In an embodiment, the controller 420 can include various electronic and/or electrical components and elements as described above with respect to FIG. 1, and thus duplicative discussion will not be repeated. The controller 420 includes operation control methods embodied in application code. The controller 420 is configured to perform operational control methods that determine, for a multitude of measuring points X, a corresponding number of distances d between the 3D scanner 400 and the measuring points X on object O in the scanned environment. The distance to a particular measuring point X is determined based at least in part on the speed of light in air through which electromagnetic radiation propagates from the 3D scanner 400 to the measuring point X In an embodiment, the phase shift in the modulated light beam 414, 416 sent to the measuring point X and received from it, is determined and evaluated to obtain a measured distance d.

The speed of light in air depends on the properties of the air such as the air temperature, barometric pressure, relative humidity, and concentration of carbon dioxide. Such air properties influence the index of refraction of the air. The speed of light in air is equal to the speed of light in vacuum divided by the index of refraction. A laser scanner of the type discussed herein is based on the time-of-flight of the light in the air (i.e., the round-trip time for the light to travel from the device to the object and back to the device). A method of measuring distance based on the time-of-flight of light (or the time-of-flight of any type of electromagnetic radiation) depends on the speed of light in air and is therefore distinguishable from methods of measuring distance based on triangulation, such as the 3D imager 20 as illustrated and described with respect to FIGS. 1-3. Triangulation-based methods involve projecting light from a light source along a particular direction and then intercepting the light on a camera pixel along a particular direction. By knowing the distance between the camera and the projector and by matching a projected angle with a received angle, the method of triangulation enables the distance to the object to be determined based on known length and two known angles of a triangle. The method of triangulation, therefore, does not directly depend on the speed of light in air.

Figure 5:
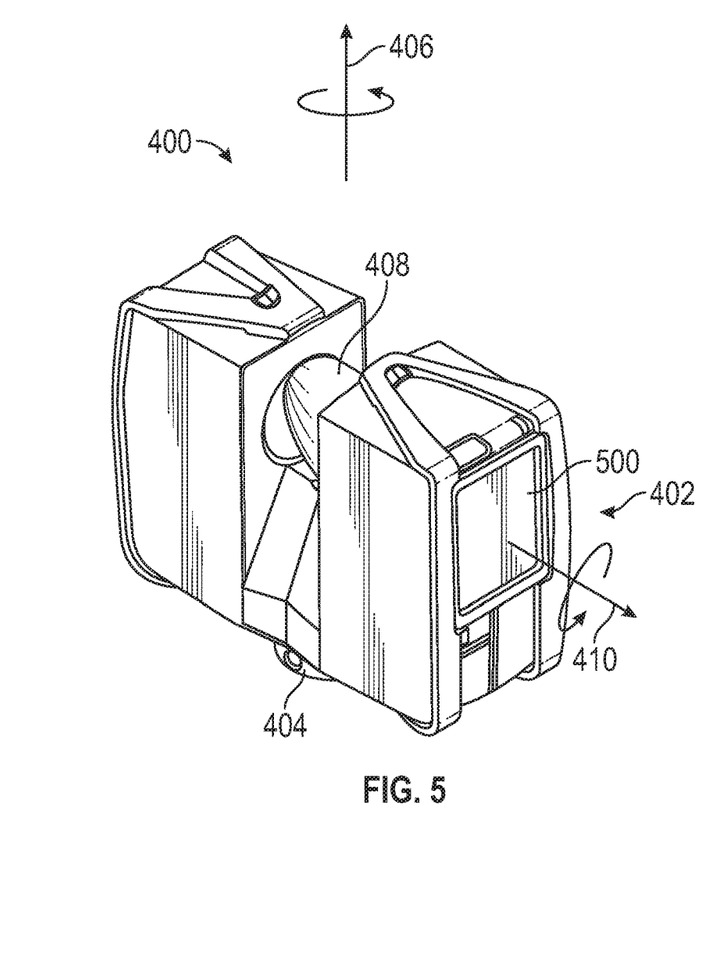
FIG. 5 is a perspective view of the 3D scanning system of FIG. 4.

In an embodiment, the measuring head 402 may include a display device 500 (FIG. 5) integrated into the 3D scanner 400. The display device 500 can include a user interface, which may be a graphical touch screen. For example, the display device 500 may have a user interface that allows the operator to provide measurement instructions to the 3D scanner 400, in particular to set the parameters or initiate the operation of the 3D scanner 400, and the display device 500 may also display measurement results.

In an embodiment, the scanning of a scanned environment by the 3D scanner 400 may take place by rotating the mirror 408 relatively quickly about the second axis 410 while rotating the measuring head 402 relatively slowly about the first axis 406, thereby moving the 3D scanner 400 in a spiral pattern. In a non-limiting example, the rotary mirror 408 may be driven to rotate at a maximum speed of 5820 revolutions per minute. A scan is defined to be the entity of measuring points X in such a measuring. For such a scan, the center $C_{10}$ defines the origin of the local stationary reference system. The base 404 rests in this local stationary coordinate frame of reference.

In addition to measuring a distance d from the center $C_{10}$ to a measuring point X on the object O (as shown in FIG. 4), the 3D scanner 400 may also collect gray-scale values related to a received optical power. The gray-scale value may be determined, for example, by integration of a bandpass-filtered and amplified signal in the light receiver 418 over a measuring period attributed to the measuring point X In some embodiments, color images can be generated by a color camera 424. Through use of these color images, colors (R, G, B) or texture can be assigned to the measuring points X as additional values.

Figure 6:
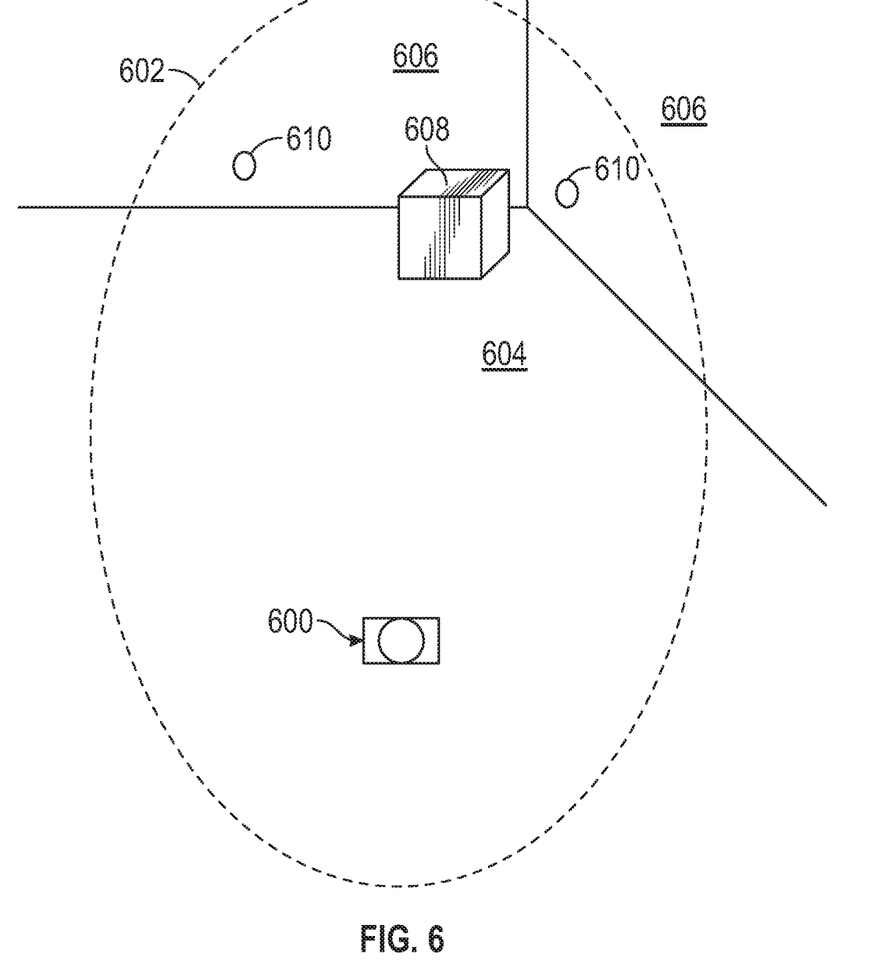
FIG. 6 is a schematic illustration of a scanned environment in accordance with an embodiment of the present disclosure.

Referring now to FIG. 6, an embodiment is shown of a measurement system 600 in accordance with an embodiment of the present disclosure is shown. In FIG. 6, the measurement system 600 can include one or more 2D and/or 3D scanner, as shown and described above, that are used to image a scanned environment 602. In this illustration, the scanned environment 602 is part of a space such as a room having a floor 604, and walls 606. The measurement system 600 is capable of determining the 3D coordinates of a large number of points within the scanned environment 602. In some embodiments, it may be desirable to obtain additional 3D coordinates (e.g., a denser point cloud) of certain areas of interest. For example, in the illustration of FIG. 6, one or more movable objects 608 and one or more fixed objects 610 may be located within the space along. For example, if the space, and thus the scanned environment 602, represents a room to be modeled, the movable objects 608 may be tables, chairs, or other structures, and the fixed objects 610 may be electrical and/or plumbing fixtures that are fixed in place regardless of the set up and/or position of the movable object 608. As shown in FIG. 6, the fixed objects 610 are positioned on the walls 606, and may be representative of outlets, switches, pipes, studs, fixtures, etc. as will be appreciated by those of skill in the art.

As noted, the measurement system 600 may include multiple coordinate measurement devices, such as a 3D imager (e.g., 3D imagers 20, 400 shown in FIGS. 1 and 4). The multiple coordinate measurement devices can be arranged to cooperate in the acquisition and determination of 3D coordinates of points within the scanned environment 602.

During a scanning operation, the measurement system 600, or a part thereof, may obtain a scan by rotating slowly about an axis while rotating a mirror rapidly about another axis (e.g., using 3D scanner 400). This causes light beams to be emitted into the scanned environment 602 and a reflected light beam to be received. From the reflected light, 3D coordinates can be determined that represent the scanned environment. Based on the location of the measurement system 600 within the scanned environment 602, coordinates can be plotted within a model having a coordinate system to generate a 3D model of the scanned environment.

The location (e.g., x-, y-, z-coordinates or an equivalent frame of reference) and pose (e.g., pan, tilt, roll, etc.) of the measurement system 600 may be determined from the scan performed by the measurement system 600.

The scanning operation by the measurement system 600 can capture data associated with the movable objects 608 and the fixed objects 610. Captured 3D coordinates of points measured by the measurement system 600 are saved as coordinate data. The coordinate data can be stored in memory, such as in a memory of the measurement system 600 or in a computing device connected (such as via LAN) to the measurement system 600. The coordinate data can then be used to generate models or digital representations of the scanned environment 602, such as on computers or other electronic devices.

Embodiments provided herein are directed to markers that enable precise indication and labeling of one or more fixed objects within a scanned space so that modeling and future work can be performed accurately. For example, during construction projects, installation tasks (e.g., kitchens, bathrooms, etc.) may require precise identification of the position and/or location of the fixed objects (e.g., plugs, electrical outlets, fixtures, pipes, sockets, etc.). The markers of the present disclosure can be used to identify the specific and precise location and positions of cables, pipes, brackets, mounts, and/or other electrical, plumbing, or other aspects associated with fixtures or other fixed objects within an installation zone (i.e., part of a scanned environment). The markers of the present disclosure can be used to aid in the installation of various fixed objects (e.g., placement, cutting of holes, placement and installation of other elements relative to the fixed object, etc.).

The markers of the present disclosure include a marker element and an adapter that enable the marker to be installed or placed in a specific location prior to a scan. A measurement system can then be used to scan a scanned environment (e.g., installation zone). That is, one or more 3D imagers can be used to scan the installation zone having one or more markers of the present disclosure, and the coordinate data of the 3D scan include data associated with the marker, the identifying a specific location of a fixed object within a model of the scanned environment or installation zone. The adapter is a structure or component that can be safety installed into a specific fixed object location (e.g., installed into an electrical socket) and may function as a plug or other element. The adapter, in some embodiments, may be a plastic element (e.g., base or plug) that fits into a hole or aperture of a fixed object (e.g., hole of an electrical outlet).

The marker elements of the present disclosure may be removably mounted or attached to the adapter such that various marker elements may be interchanged to a single adapter and/or a single marker may be installed on different adapters. The marker element includes a coded identifier that can be used to provide various information during a scanning operation, including, but not limited to, identification of specific fixed object (e.g., specific electrical socket), electrical and/or plumbing information or other information associated with the type of fixed object the marker is representing in the scanned environment, circuit information associated with an electrical circuit, plumbing information (e.g., hot/cold water, potable/non-potable water, heating pipes, type of pipe (e.g., PVC, copper, etc.), etc.), or other information associated with the marker. In some embodiments, the adapter may be configured to connect with the fixed object. For example, in some embodiments, the adapter may include electrical contacts to enable powering of the marker such that the marker element may be an illuminated marker element.

Figure 7A:
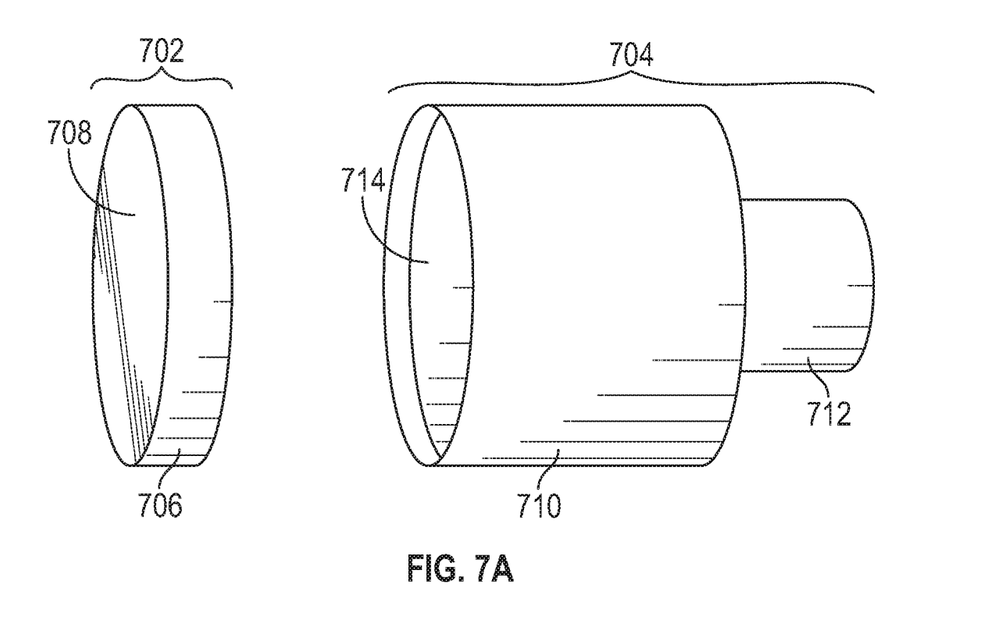
FIG. 7A is an exploded illustration of a marker in accordance with an embodiment of the present disclosure.
Figure 7B:
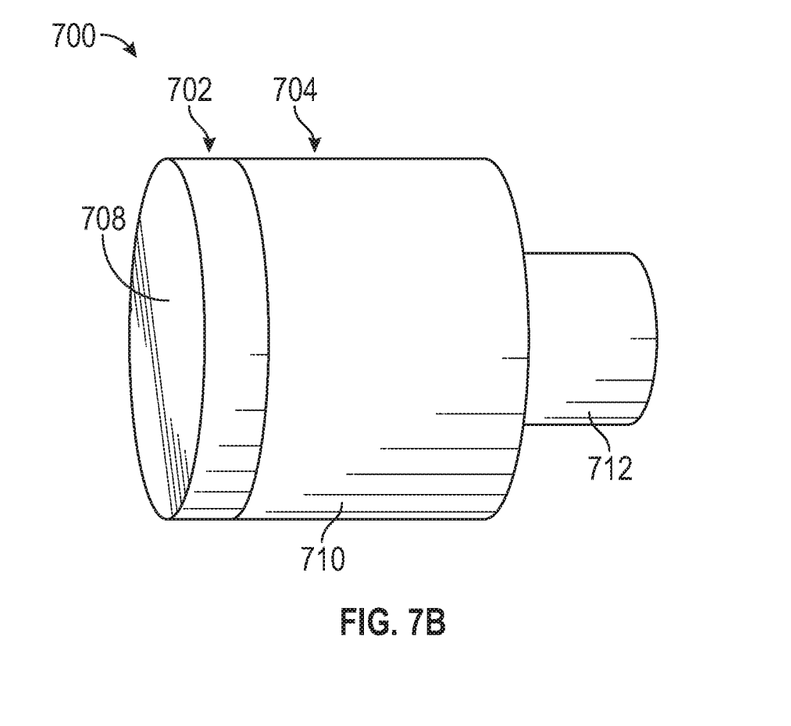
FIG. 7B is an assembled illustration of the marker of FIG. 7A.

Turning now to FIGS. 7A-7B, schematic illustrations of a marker 700 in accordance with an embodiment of the present disclosure are shown. The marker 700 is a marker to be used for 3D scanning and/or imaging of a scanned environment or installation zone, as discussed above. The marker 700 is configured to be installed within the scanned environment at specific locations to enable identification of the precise location and/or provide additional information about a fixed object within the scanned environment. FIG. 7A illustrates the marker 700 in an exploded or separated view and FIG. 7B illustrates the marker 700 in an assembled view.

The marker 700 includes a marker element 702 and an adapter 704. In the present embodiment, the marker element 702 is an element that is removably attachable or mountable to the adapter 704. However, this is not to be limiting, and in some embodiments, the marker element 702 may be integrally formed with, part of, or permanently attached to the adapter 704.

The marker element 702 includes a marker base 706 and a coded identifier 708. The marker base 706, in this embodiment, is arranged to engage with and attach to the adapter 704. The coded identifier 708 can include one or more features that are optically identifiable by a measurement system (e.g., one or more 3D imagers as described above).

The adapter 704 includes an adapter base 710 and a fixed object connector 712. The adapter base 710 can include an attachment element 714 that is arranged to receive the marker base 706. In some embodiments, the attachment element 714 may be a flat or smooth surface and the marker base 706 may be attached to the adapter base 710 by an adhesive or other material. In other embodiments, the attachment element 714 may be a physical structure, such as a receiving structure that is engageable with the marker base 706. In some such embodiments, the attachment element 714 and the marker base 706 may form a tongue-and-groove or threaded engagement arrangement. In some embodiments, the marker base 706 may form a flat or thin sticker-like element that is applied to the attachment element 714. As will be appreciated by those of skill in the art, the engagement, attachment, or mounting of the marker element 702 to the adapter 704 may take any form without departing from the scope of the present disclosure. Further, in some embodiments, the marker element 702 may be printer or painted on the adapter 704 and thus a single or unitary structure or device may be formed.

The fixed object connector 712 of the adapter 704 is arranged to engage with part of an installation zone or scanned environment. For example, the fixed object connector 712 may be formed as prongs of an electrical contact that can be inserted into an outlet, wherein the marker 700 is arranged to identify the outlet in the scanned environment. In some embodiments, the fixed object connector 712 extends from the adapter base 710, as shown, but in other embodiments, the fixed object connector 712 and the adapter base 710 may be a single shape, size, geometry, etc. and be a single body or element that is inserted into or placed to identify a fixed object of a scanned environment.

It should be appreciated that since the geometric configuration of the coded pattern 708 or the adapter base 710 relative to the connector 712 is known, the position of the object in the environment will also be known with a high level of accuracy. Thus, during operation, when the marker 700 is scanned, the location and position of the underlying environmental object (e.g. the electrical plug) may be determined with a high level of accuracy.

Figure 8:
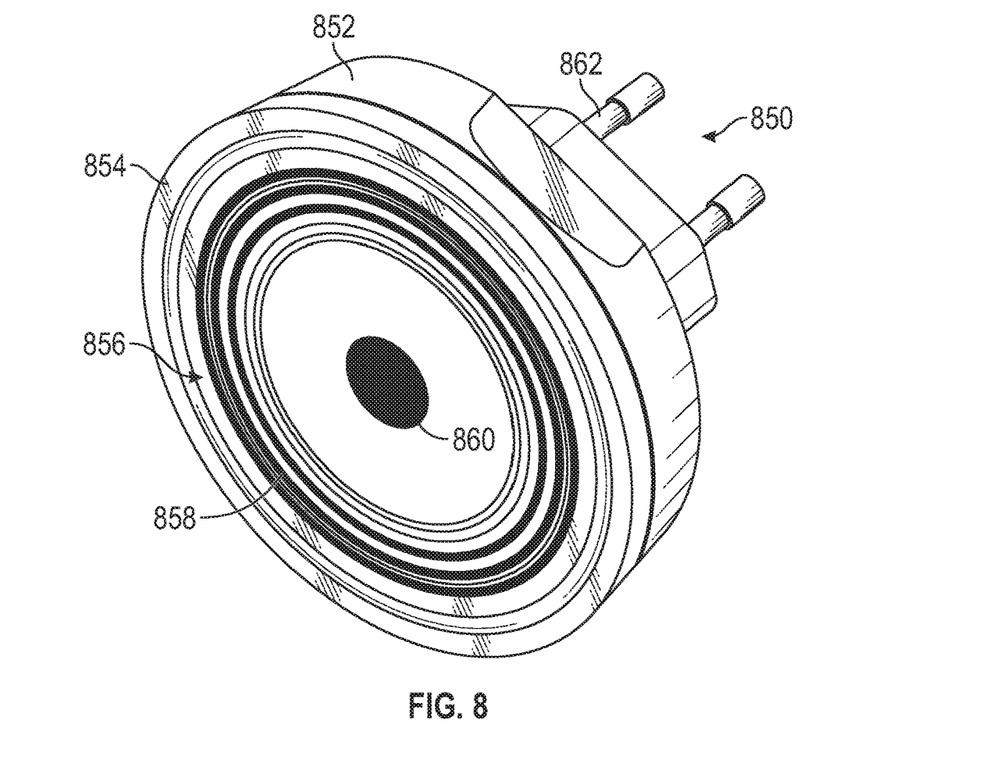
FIG. 8 is a schematic illustration of a marker in accordance with an embodiment of the present disclosure.

Turning now to FIG. 8, a schematic illustration of a marker 850 in accordance with an embodiment of the present disclosure is shown. The marker 850 may be similar to that shown and described above, and thus similar features may not be shown or described above. As shown, the marker 850 includes an adapter 852 and a marker element 854. The marker element 854 includes a coded identifier 856 that is part of the marker 850. The coded identifier 856, as shown, is shaped similar to the geometry and shape of the marker element 854 and thus can represent a fixed object having the same shape and position when the marker 850 is installed in a scanned environment.

The coded identifier 856, in this embodiments, is a circular coded marking that can be optically identified and interpreted by a measurement system (e.g., one or more 2D and/or 3D scanners as described above). The coded identifier 856 can include multiple parts, such as a coded portion 858 and a central portion 860. The coded portion 858 may be a code, such as a bar code, binary code, etc. that can be set to represent specific information. The central portion 860 may be a central point that is arranged to identify and mark the center or specific location of a fixed object represented by the marker 850.

In a model generated by a measurement system of the present disclosure, the markers described herein enable precise information, position, and location of a fixed object within a scanned environment. Thus, when a user views the model of the scanned environment, the user may know the exact location of the fixed object and can plan accordingly. For example, the marker may represent an outlet within an installation zone. The marker can be installed within the outlet and a scan may be performed. A model may then be generated from the scan, and information associated with the outlet may be part of the model. Subsequent actions, such as cutting holes, can be precisely planned based on the information within the model.

It should be appreciated that while the embodiment of FIG. 8 illustrates the marker as having a connector 862 for a Type CEE 7 electrical socket, this is for example purposes and not intended to be limiting. In other embodiments, the connector 862 may include features that adapt to any known electrical outlet, such as a NEMA 1-15 or a NEMA 5-15 electrical outlet for example. It should further be appreciated, as has been described herein, the connector 862 may adapt the marker 850 to other types of objects in the environment, such as but not limited to pipes, conduits, vents, electrical fixtures, electrical junction boxes, and light fixtures for example.

Figure 9:
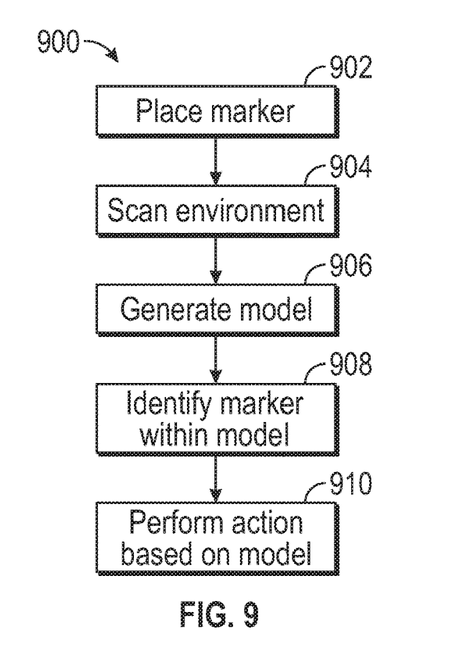
FIG. 9 is a flow process in accordance with an embodiment of the present disclosure.

Turning now to FIG. 9, a flow process 900 in accordance with an embodiment of the present disclosure is shown. The flow process 900 can employ various components, as described above, including the measurement systems and/or the markers of the present disclosure.

At block 902, a marker is installed within a scanned environment. The marker is installed within and/or to a fixed object of the scanned environment, such as an outlet, socket, fixture, etc. The marker is installed such that a coded identifier of the marker is displayed and captureable by a measurement system.

At block 904, the scanned environment is scanned using a measurement system (e.g., one or more 2D and 3D imagers). The scanning operation includes capturing and recording data associated with the scanned environment. For example, the scanning operation can include obtaining a point cloud in a three-dimensional space. The data may be recorded on the imager of the measurement system, or may be recorded on another device, such as a computer. The data may be three-dimensional coordinate data.

At block 906, the data obtained at block 904 during the scanning operation is then used to generate a model of the scanned environment.

At block 908, which may occur simultaneously as block 906, the marker is identified within the model. That is, the precise location of the marker within the model is identified and placed within the model. The information associated with the marker within the model can include dimensions, size, shape, distances, depths, placement, relationship to other elements/objects, etc.

At block 910, based on the model generated at blocks 906-908, an action can be taken based on the information presented therein. For example, a user can cut a hole in a very precise location within the scanned environment associated with the marker within the model.

Technical effects include markers enabling very specific and precise identification and location of fixed objects of a scanned environment in a model of the scanned environment. The markers include an adapter to be installed within the scanned environment and a marker element that is identifiable by a scanning or measurement system.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A method of generating a model of a scanned environment, the method comprising:
installing a marker to a fixed object within the scanned environment, wherein the marker includes an adapter and a marker element, wherein the adapter is arranged to be at least one of installed, placed, and attached to the fixed object of the scanned environment and the marker element includes a coded identifier that is detectable by a 3D imager, wherein the coded identifier identifies a specific location of the fixed object within the scanned environment;

scanning the scanned environment with a 3D imager to obtain three-dimensional coordinate data of the scanned environment, wherein the three-dimensional coordinate data includes data associated with the coded identifier; and generating a model of the scanned environment based on the three-dimensional coordinate data obtained during the scanning, wherein the data associated with the coded identifier enables precise identification of the location of the fixed object within the model of the scanned environment, wherein the marker element is removably attachable to the adapter, wherein the adapter comprises an adapter base and a fixed object connector, wherein the fixed object connector is arranged to engage with the fixed object of the scanned environment and wherein the fixed object connector is an electrical connector for insertion into an outlet.

2. The method of claim 1, wherein the coded identifier is shaped similar to at least one of a geometry and a shape of the marker element.

3. The method of claim 1, wherein the coded identifier includes a coded portion and a central portion, wherein the coded portion is readable by the 3D imager to convey information about the marker and the central portion is arranged to identify a center of the fixed object.

4. The method of claim 1, wherein the 3D imager comprises at least one of a triangulation imager device and a time-of-flight scanning device.

5. The method of claim 1, wherein the coded identifier is a circular coded marking.

6. The method of claim 1, wherein the coded identifier comprises at least one of a bar code and a binary code.

7. The method of claim 1, wherein the adapter base has the marker element installed thereto.

8. The method of claim 1, wherein the marker element and the adapter are attachable by at least one of a tongue-and-groove and a threaded engagement.

9. A three-dimensional (3D) measurement system comprising:
 a 3D imager; and
 a marker comprising:
  an adapter and a marker element, wherein the adapter is arranged to be at least one of installed, placed, and attached to a fixed object of a scanned environment and the marker element includes a coded identifier that is detectable by the 3D imager, wherein the coded identifier identifies the specific location of the fixed object within the scanned environment, and
  wherein the adapter comprises an adapter base and a fixed object connector, wherein the fixed object connector is arranged to engage with the fixed object of the scanned environment, and the fixed object connector is an electrical connector for insertion into an outlet.

10. The measurement system of claim 9, wherein the marker element and the adapter form a unitary structure.

11. The measurement system of claim 9, wherein the coded identifier includes a coded portion and a central portion, wherein the coded portion is readable by the 3D imager to convey information about the marker and the central portion is arranged to identify a center of the fixed object.

12. The measurement system of claim 9, wherein the 3D imager comprises at least one of a triangulation imager device and a time-of-flight scanning device.

13. The measurement system of claim 9, wherein the coded identifier is shaped similar to at least one of a geometry and a shape of the marker element.

14. The measurement system of claim 9, wherein the coded identifier is a circular coded marking.

15. The measurement system of claim 9, wherein the coded identifier comprises at least one of a bar code and a binary code.

16. The measurement system of claim 9, wherein the adapter base has the marker element installed thereto.

17. The measurement system of claim 9, wherein the marker element and the adapter are attachable by at least one of a tongue-and-groove and a threaded engagement.

18. A three-dimensional (3D) measurement system marker comprising:
 an adapter; and
 a marker element,
 wherein the adapter is arranged to be at least one of installed, placed, and attached to a fixed object of a scanned environment and the marker element includes a coded identifier that is detectable by a 3D imager, wherein the coded identifier identifies a specific location of the fixed object within the scanned environment, and
 wherein the adapter comprises
 an adapter base; and
 a fixed object connector,
 wherein the fixed object connector is arranged to engage with the fixed object of the scanned environment, and the fixed object connector is an electrical connector for insertion into an outlet.

* * * * *